United States Patent
Ho et al.

(10) Patent No.: US 8,819,435 B2
(45) Date of Patent: Aug. 26, 2014

(54) GENERATING PROTOCOL-SPECIFIC KEYS FOR A MIXED COMMUNICATION NETWORK

(75) Inventors: Sai Yiu Duncan Ho, San Diego, CA (US); Roy Franklin Quick, Jr., San Diego, CA (US); Bibhu Prasad Mohanty, San Diego, CA (US); Etan Gur Cohen, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 13/610,831

(22) Filed: Sep. 11, 2012

(65) Prior Publication Data

US 2013/0246783 A1  Sep. 19, 2013

Related U.S. Application Data

(60) Provisional application No. 61/533,488, filed on Sep. 12, 2011.

(51) Int. Cl.
  *H04L 29/06* (2006.01)
  *H04L 9/14* (2006.01)
  *H04L 9/08* (2006.01)

(52) U.S. Cl.
  CPC .................. *H04L 63/06* (2013.01); *H04L 9/14* (2013.01); *H04L 9/0861* (2013.01)
  USPC .......................................... 713/171; 380/260

(58) Field of Classification Search
  CPC .......... H04L 63/06; H04L 9/14; H04L 9/0861
  USPC ........................................ 713/171; 380/260
  See application file for complete search history.

(56) References Cited

U.S. PATENT DOCUMENTS

| 7,464,265 B2 | 12/2008 | Ayyagari et al. |
| 7,787,627 B2 | 8/2010 | Sood et al. |
| 8,238,877 B2 | 8/2012 | Ramankutty et al. |
| 2005/0254653 A1 | 11/2005 | Potashnik et al. |
| 2010/0281249 A1* | 11/2010 | Das et al. ..................... 713/151 |
| 2011/0093717 A1 | 4/2011 | Iwao et al. |
| 2013/0246783 A1 | 9/2013 | Ho et al. |

FOREIGN PATENT DOCUMENTS

WO  2013040098  3/2013

OTHER PUBLICATIONS

IEEE, "P802.21/D14, Sep. 2008—IEEE Draft Standard for Local and Metropolitan Area Networks: Media Independent Handover Services", Sep. 17, 2008, pp. 226-239.*
International Search Report and Written Opinion—PCT/US2012/054949—ISA/EPO—Dec. 12, 2012.

(Continued)

*Primary Examiner* — Kambiz Zand
*Assistant Examiner* — Michael Guirguis
(74) *Attorney, Agent, or Firm* — DeLizio Gilliam, PLLC (57) ABSTRACT

Security keys are typically needed to communicate with various network communication protocols of a mixed communication network. Herein, a protocol-specific key for a particular network communication protocol is generated based upon a result of a hash operation that includes a network key associated with the mixed communication network and information corresponding to the particular network communication protocol. Interoperability of multiple devices in the mixed communication network is made possible when the multiple devices generate (i.e. derive) protocol-specific keys using the same network key and common information corresponding to particular network communication protocols.

27 Claims, 5 Drawing Sheets

(56) References Cited

OTHER PUBLICATIONS

King N. J., et al., "Deliverable 6.2 Security specifications", ICT-213311 Omega, Jul. 9, 2009, retrieved from the Internet: URL:http://www.ict-omega.eu/fileadmin/documents/deliverables/Omega-D6.2.pdf.

P1905.1 Working Group: "P1905.1/D05 Draft Standard for a Convergent Digital Home Network for Heterogeneous Technologies", May 4, 2012 (May 9, 2009), XP055047812, ISBN: 978-0-73-817434-1. Retrieved from the Internet:URL: http://ieeexplore.ieee.org/servlet/opac?punumber=6197675. [retrieved on Dec. 13, 2012], p. 59-p. 65.

PCT Application No. PCT/US2012/054949 Written Opinion of the IPEA, Aug. 12, 2013, 6 pages.

\* cited by examiner

GENERATING PROTOCOL-SPECIFIC KEYS FOR A MIXED COMMUNICATION NETWORK

CROSS-REFERENCE TO RELATED APPLICATIONS

This application claims the priority benefit of U.S. Provisional Application Ser. No. 61/533,488 filed Sep. 12, 2011.

BACKGROUND

The present invention relates to the field of communication, and more particularly to a system and method of generating protocol-specific keys for use in a mixed communication network.

In recent years, devices and communication protocols have become more and more prevalent. For example, users often have multiple different devices supporting multiple different communication protocols. Devices may generally support a single communication protocol or a plurality of different communication protocols, such as Ethernet, 802.11, Bluetooth, powerline communication (PLC), multimedia over coaxial (MoCA), IEEE 1901 compliant protocols, etc. Additionally, new and improved communication protocols are constantly being developed. Typically, the communication mechanisms and protocol specifics (e.g., device and topology discovery protocols, bridging protocols, etc.) are unique to each networking technology. In this disclosure the terms "networking technology," "access technology" and "communication protocol" may be used interchangeably to refer to the different protocols and technologies that may be used in a mixed communication network. A mixed communication network may also be referred to as a hybrid communication network.

Given the proliferation of devices and communication protocols, it is desirable to create networks that allow different devices to communicate using a variety of different communication protocols. Accordingly, improvements in communication networks are desired.

SUMMARY

Various embodiments are presented of a system and method of generating one or more protocol-specific keys for use in a mixed communication network. In one embodiment, a protocol-specific key for use with a first network communication protocol of a mixed communication network is generated at a first device. The protocol-specific key is based upon a result of a hash operation that includes a network key associated with the mixed communication network and information corresponding to the first network communication protocol. The protocol-specific key is used to communicate with a second device in the mixed communication network via the first network communication protocol. In a further embodiment, in addition to the first protocol-specific key, a second protocol-specific key associated with a second network communication protocol of the mixed communication network is generated. The same network key may be used in the hash operation to generate a plurality of protocol-specific keys. The second protocol-specific key is based upon a result of a second hash operation that includes the network key and information corresponding to the second network communication protocol. The protocol-specific key is used to communicate with a third device via the second network communication protocol.

BRIEF DESCRIPTION OF THE DRAWINGS

The present embodiments may be better understood, and numerous objects, features, and advantages made apparent to those skilled in the art by referencing the accompanying drawings, in which like reference numerals refer to substantially similar items throughout.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to specific types of communication protocols in a mixed communication network, the present disclosure relates to generating protocol-specific keys for any number of current or future networking technologies that may be used in a mixed communication network. In other instances, well-known instruction instances, protocols, structures, and techniques have not been shown in detail in order not to obfuscate the description.

Various embodiments are presented of a system and method of generating protocol-specific keys for use in a mixed communication network. The communication network may be implemented in a home (e.g., as a convergent digital home network, "CDHN") or business, as desired. The network may include a plurality of devices using a plurality of different communication protocols, and may therefore be a "mixed communication network". In a mixed communication network (such as a converged digital home network, or P1905.1 compliant network, which may also be referred to as a hybrid communication network, or hybrid network), a network may allow for the utilization and interfacing of heterogeneous networking technologies. For example, IEEE P1905.1 defines an abstraction layer for multiple home network technologies that provides a common interface to the several popular network technologies: IEEE 1901 over powerlines, Wi-Fi/IEEE 802.11 for wireless, Ethernet over twisted pair cable and MoCA 1.1 over coax. The devices may be any of a variety of devices, such as desktop computers, laptops, netbooks, tablets, smart phones, displays, audio video devices, gaming consoles, home appliances, controlling devices (e.g., for lights, air conditioning, alarm systems, etc.), etc.

To communicate via a particular network communication protocol in a mixed communication network, a device typically requires a security key (also referred to as a u-key). A security key is a privacy parameter associated with one of the underlying P1905.1 network technologies. Examples of security keys commonly used in a mixed communication network may include (without limitation) a Wi-Fi WPA/WPA2 Passphrase, a 1901 Shared Key DSNA, a 1901 PSNA Pairwise Master Key (PMK), a 1901 RSNA Preshared Key (PSK), or a MoCA Privacy Password. The security key may be used for encryption of communications over the particular network communication protocol. Preferably, each network communication protocol may be associated with a different security key so that a breach in security for a first network communication protocol does not compromise security for a second network communication protocol.

However, it is cumbersome to provision multiple security keys for a mixed communication network to support each of the various network communication protocols that may be used in the mixed communication network. The introduction of a new network communication protocol to the mixed communication network may require the provisioning of an additional security key for use with the new network communication protocol.

In accordance with this disclosure, a network key may be used to derive protocol-specific keys for more than one network communication protocol associated with the mixed communication network. The network key is used in combination with information corresponding to a particular network communication protocol to generate a protocol-specific key that are specific for the particular network communication protocol. The protocol-specific key may be made to the correct length for a particular access technology by concatenating or truncating operations.

In one embodiment, the same network key is used to generate different protocol-specific keys for each of a plurality of network communication protocols. Initially, a network key may be stored. The network key may be stored or received in response to user input, e.g., providing the network key. For example, the network key may be received by a device that the user is currently using. Alternatively, the network key may be stored by another device, such as an access point to which various devices of the mixed communication network are coupled. Thus, the network key may be stored by any number of devices in the mixed communication network.

Some information corresponding to the network communication protocol (e.g. an ASCII representation unique to the access technology) is used with the network key to generate a protocol-specific key (which may also be referred to as a protocol-specific security key) that is specific to the network communication protocol. For example, k bits from a network key is used with m bits from information about the network communication protocol (e.g. an ASCII field with text unique to each access technology, such as {"Wi-Fi", "MoCA", "1901", . . . }) in the generation of the protocol-specific key. For example, the network key (k bits) and the ASCII text m bits are used as inputs to a hash operation to generate a protocol-specific key of length n bits that is specific for the particular network communication protocol.

The information corresponding to each of a plurality of communication protocols in the mixed communication network may be stored and may be the same information at multiple devices in the mixed communication network. For example, the information may be stored in a format that enumerates each of the plurality of communication protocols (e.g., where text labels are provided in ASCII format for each communication protocol).

In some embodiments, it may be necessary to truncate the result of the hash operation to obtain a particular number n of bits needed for a particular network communication protocol. For example a SHA-256 hash operation may result in a hash value having 256 bits. The result of the hash operation may be truncated (e.g. using x least significant bits) to generate a shorter protocol-specific key. Alternatively, where more bits are necessary (e.g., a greater number of bits are necessary for encryption than is generated from the hash operation), two hashes may be generated and concatenated to the appropriate size. For example, if a 512 bit protocol-specific key is required, the particular network communication protocol may be identified by two or more text strings corresponding to the particular network communication protocol. Accordingly, the protocol-specific key may be created by concatenating the results of two hash operations generated from each of the two or more text strings.

An access point or other hybrid network device may utilize the network key to generate a plurality of protocol-specific keys, one protocol-specific key for each network communication protocol supported by the mixed communication network. Thus, when a new device is introduced to the mixed communication network, the new device may utilize the network key and information corresponding to one or more network communication protocols supported by the new device to generate the protocol-specific key(s) for each network communication protocol supported. Therefore, a user may only need to provide the network key for each device (or the network key may be generated or shared by other means), while the devices generate the appropriate protocol-specific keys to utilize for particular access technologies that each device supports.

In some embodiments, the disclosure may allow for new networking communication protocols to be supported (e.g. including future network communication protocol that may be developed over time). The information corresponding to the plurality of network communication protocols may be updated to further include information corresponding to a new networking communication protocol (e.g., by adding a new portion corresponding to the new networking communication protocol to the information). Accordingly, a new protocol-specific key may be generated using the new portion of information (e.g. the portion of the information that corresponds to the new network communication protocol) and the same network key.

In the foregoing detailed descriptions of the figures, various example embodiments are described. It should be understood that the figures and accompanying descriptions are provided as examples only and are not intended to limit the scope of the embodiments described herein.

Figure 1:
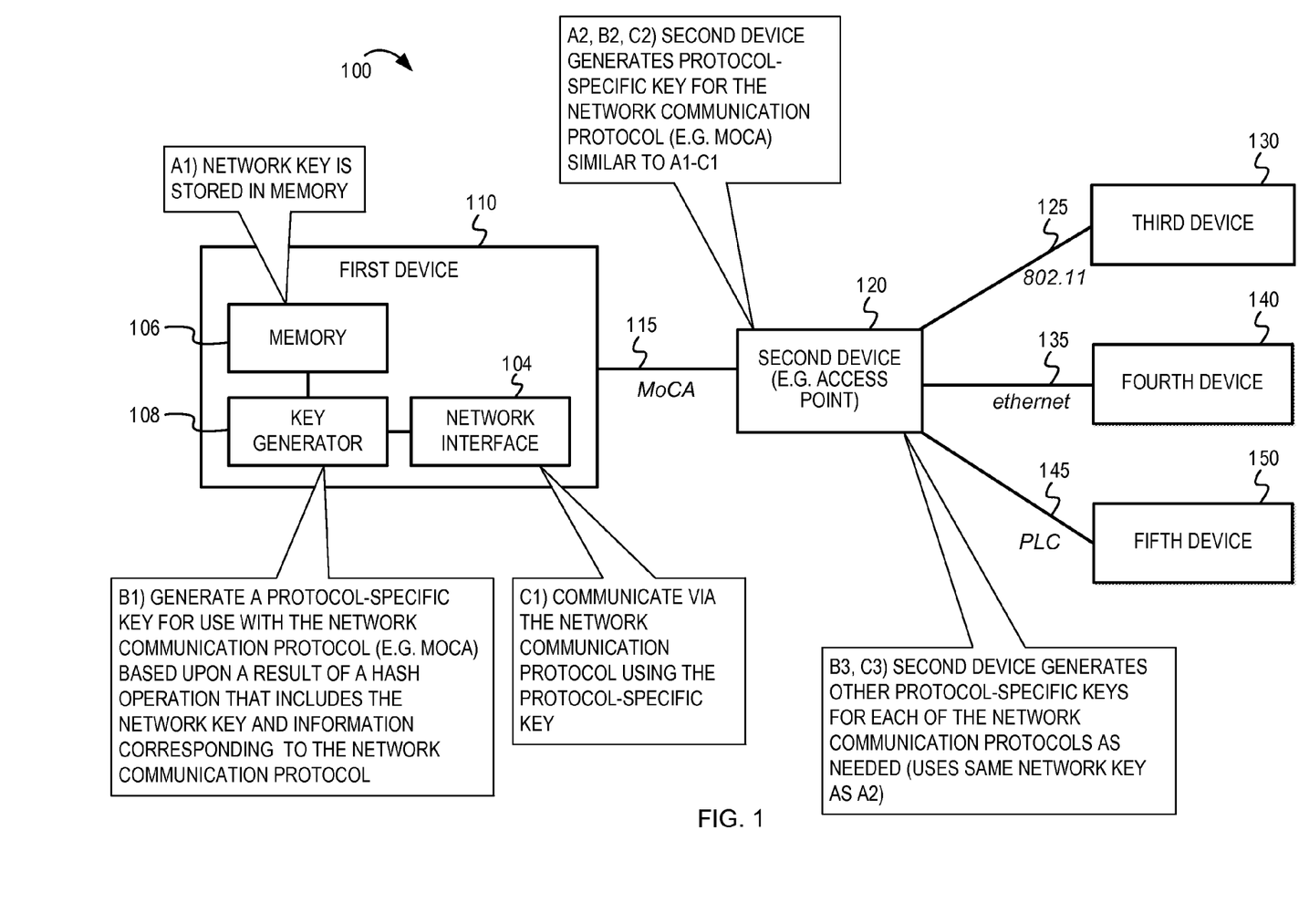
FIG. 1 is an example block diagram illustrating a communication network with a plurality of devices which may be configured to generate protocol-specific keys for use in an example mixed communication network in accordance with an embodiment of the present disclosure.

FIG. 1 is an example block diagram illustrating a mixed communication network with a plurality of devices which may be configured to generate protocol-specific keys. FIG. 1 depicts a mixed communication network 100 comprising a first device 110, a second device 120, a third device 130, a fourth device 140, and a fifth device 150. It is noted, however, that in some examples one or more of the devices 110, 120, 130, 140, 150 may be hybrid network devices (such as second device 120) configured with more than one network interface and supporting multiple network communication protocols. In the figure, the first device 110 includes a memory 106, a network interface 104, and a key generator 108. In some implementations, the memory 106, network interface 104, and key generator 108 may be implemented in one or more communication units of the first device 110 that implement protocols and functionality to enable communications via the mixed communication network 100. The second device 120 may also have corresponding components for memory (not shown), network interface (not shown), and key generator (not shown). It should be understood that each device of FIG. 1 may include such corresponding component which are not illustrated in the figure in the interest of conciseness.

In some implementations, the devices 110, 120, 130, 140, 150 can each be an electronic device, such as a laptop computer, a tablet computer, a mobile phone, a smart appliance, a gaming console, a desktop computer, or another suitable electronic device. One or more of the devices 110, 120, 130, 140, 150 may be a network node, such as an access point, gateway device, or other such device configured to provide network connectivity between two or more network segments.

In the example communication network 100, first device 110 has a network connection 115 to second device 120. For the purpose of illustrating further examples, the second device 120 has a network connection 125 to the third device 130, a network connection 135 to the fourth device 140, and a network connection 145 to the fifth device 150. Each of the network connections 115, 125, 135, 145 may utilize different protocol-specific keys derived according to this disclosure because each of the network connections 115, 125, 135, 145 is configured to utilize different network communication protocols in the example illustrated in FIG. 1. The network connection 115 is configured to use the network communication protocol for multimedia over coaxial (MoCA). The network connection 125 is configured to use the network communication protocol for IEEE 802.11 (also referred to as WLAN). The network connection 135 is configured to use the network communication protocol for wired local area network (also referred to as Ethernet). The network connection 145 is configured to use the network communication protocol for powerline communications (PLC).

Having identified the devices, network connection, and network communication protocols of this example mixed communication network, various examples will now be described using FIG. 1.

In accordance with one embodiment, the first device 110 derives a security key for the MoCA network connection 115 based upon a network key. At stage A1, the network key may be stored in memory of the first device 110. In some implementations, the network key may be received at the first device via one of a user interface (not shown) of the first device, a sensor (not shown) of the first device, or a second network interface (not shown) of the first device. The network key stored at stage A1 is the same network key used by second device 120 (as well as devices 130, 140, 150) to derive protocol-specific keys.

At stage B1, the first device 110 generates a protocol-specific key for use with the MoCA network communication protocol. The protocol-specific key is based upon a result of a hash operation that includes the network key associated and information corresponding to the MoCA network communication protocol (e.g. an ASCII text field specifying "MoCA"). Depending on the type of hash operation, the result of the hash operation may be longer than needed for the protocol-specific key (i.e. MoCA Privacy Password) corresponding to the MoCA network communication protocol. For example, if the hash operation utilizes a SHA-256 has function, the result would be 256 bits long. But the MoCA Privacy Password is a 17 decimal digit password. In this scenario, the result of the hash operation is truncated such that the 68 least significant bits are used. The 68 bits are converted to decimal digits (one digit for each 4 bits, converted from hexadecimal to decimal using a modulo function) to obtain the 17 decimal digits used as the protocol-specific key (i.e. MoCA Privacy Password.) It is noted, however, that in other implementations, the first device 110 may be configured to communicate with the second device 120 using a different network communication protocol (e.g., powerline communication, WLAN, Ethernet, etc.), and the first device 110 may generate a protocol-specific key having a length of bits associated with security keys of that particular network communication protocol in a similar manner (e.g., as will be further described below with reference to FIGS. 2-4).

At stage C1, first device communicates via the MoCA network communication protocol using the protocol-specific key generated at stage B1. Communicating using the protocol-specific key may include performing authentication and/or encryption using the protocol-specific key.

It should be understood that both the first device 110 and the second device 120 will derive the same protocol-specific key for the MoCA network communication protocol because they will utilize the same procedures and the same network key. Accordingly, at stages A2, B2, C2, the second device 120 generates the protocol-specific key for the MoCA network communication protocol in the same way as described for stages A1, B1, and C1, respectively. Thus because the first device 110 and the second device 120 have derived the same protocol-specific key, they can communicate securely using the MoCA network communication protocol.

Continuing with the example in FIG. 1, the second device 120 may be a hybrid device and may have multiple network interfaces supporting multiple network communication protocols. At stages B3 and C3 (similar to stages B2 and C2, respectively), the second device 120 derives further protocol-specific keys for each of the network communication protocols as needed. For example, the second device 120 may derive a protocol-specific key for 802.11 to utilize for communications over the network connection 125 via the 802.11 network communication protocol.

Figure 2:
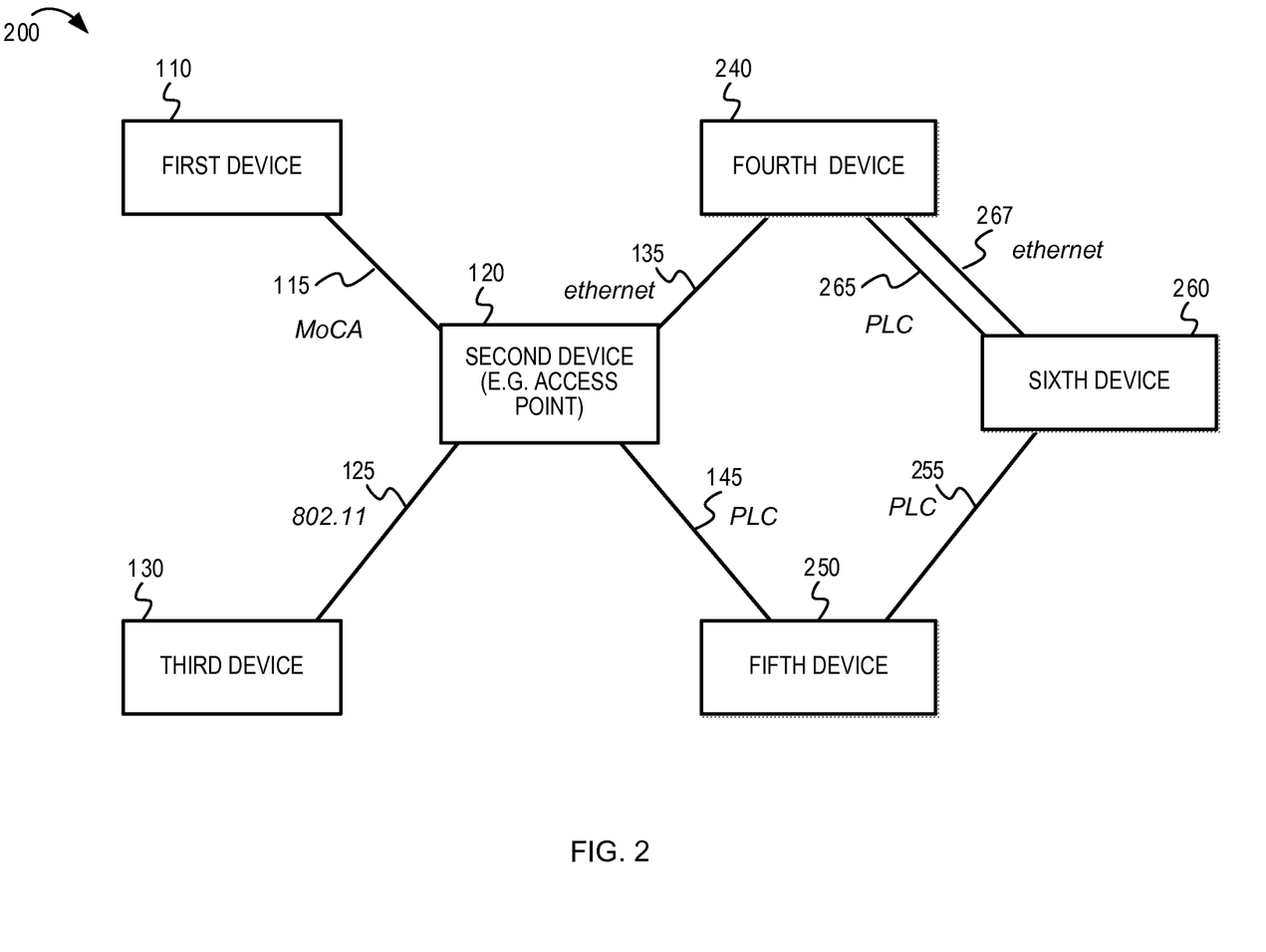
FIG. 2 is an illustration of an example of a mixed communication network in accordance with an embodiment of the present disclosure.

FIG. 2 illustrates another example mixed communication network 200 according to one embodiment. As in FIG. 1, the example mixed communication network 200 comprises a first device 110, a second device 120, and a third device 130. The second device 120 has network connections 115, 125, 135, 145 as described in FIG. 1. However, rather than fourth device 140 in FIG. 1 which had only a single Ethernet network connection, the fourth device 240 in FIG. 2 is a hybrid device and also supports powerline communication (PLC). Similarly, fifth device 250 differs from the fifth device 150 in FIG. 1 in that it may have multiple network interfaces. The topologies in FIG. 2 are used to show the versatility of the protocol-specific keys derived from a common network key.

The fifth device 250 has the PLC network connection 145 to the second device and also has a PLC network connection 255 to a sixth device 260. For example, the fifth device 250 may be a bridging device in this example. Even though the sixth device 260 does not have a direct connection to the second device 120 (acting as the access point), the sixth device may have the network key associated with the mixed communication network. Thus, both fifth device 250 and the sixth device 260 are able to generate a PLC protocol-specific key based upon a result of a hash operation that includes the network key and information corresponding to the PLC network communication protocol.

As shown in FIG. 2, the fourth device 240 and the sixth device 260 may share two or more network connections 265, 267 between them. Even though network connections 265 and 267 may use different network communication protocol (PLC on network connection 265 and Ethernet on network connection 267), communications may be encrypted using protocol-specific keys derived from the same network key and information corresponding to each of the PLC network communication protocol and the Ethernet network communication protocol. Note that the above described communication protocols are exemplary only and further communication protocols may be supported, such as WiMax, USB, ThunderBolt, Bluetooth, CDMA, GSM, LTE, etc.

Figure 3:
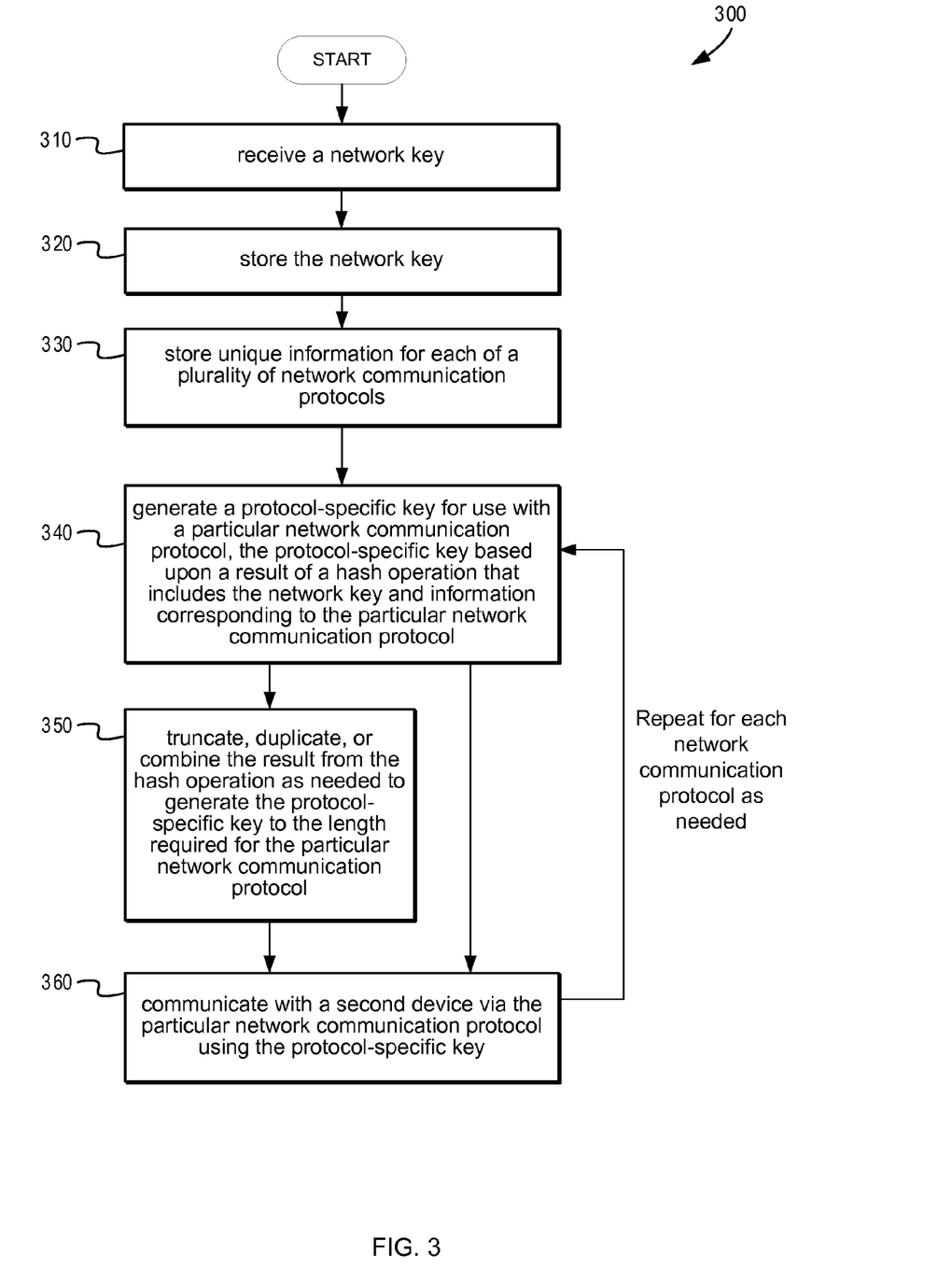
FIG. 3 is a flowchart diagram illustrating one embodiment of a method of generating protocol-specific keys for use in a mixed communication network in accordance with an embodiment of the present disclosure.

Some or all of the devices discussed above may be configured to perform the method described in FIG. 3.

FIG. 3 is a flowchart diagram illustrating one embodiment of a method 300 of generating protocol-specific keys. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Initially, at 310, a network key may be received at a first device via one of a user interface of the first device, a sensor of the first device, or a second network interface of the first device. For example, a user input may be received via a keyboard or touch screen interface. Alternatively, a camera sensor of the first device may obtain an image having the network key encoded. The network key may also be received via an NFC communication or a message received via a different network communication protocol than the one being configured (e.g., a message from a different network device). A detachable memory or temporary USB wired connection may be used to convey the network key to the first device. Many alternative ways for the first device to receive the network key may be conceived by persons of skill in the relevant art. Preferably the mechanisms used to convey the network key are themselves private or secure so as to protect the security of the mixed communication network.

At 320, the network key may be stored in memory. It should be noted that the network key may be stored in temporary or transient memory only for a period of time needed for the first device to generate the protocol-specific key. Alternatively, the network key may be stored in long-term or persistent memory for subsequent use in generating further protocol-specific keys.

Additionally, at 330, information corresponding to a plurality of network communication protocols in the mixed network may be stored. In one embodiment, the information may include portions for each of the plurality of communication protocols. For example, the information may be stored in a file that enumerates each of the plurality of communication protocols (e.g., where names are provided in ASCII format for each protocol). For protocols that require additional bits (e.g., more than 256 bits), more than one portion or name may be allocated for each communication protocol. Alternatively, information corresponding to the plurality of network communication protocols may be cached temporarily or may be programmatically reproduced when needed. However, it should be understood that the information corresponding to the plurality of network communication protocols is also the same used by other devices generating corresponding protocol-specific keys. Multiple vendors of devices for mixed communication networks may use common information corresponding to various network communication protocols.

At 340, the first device generates a protocol-specific key for use with a particular network communication protocol, the protocol-specific key based upon a result of a hash operation that includes the network key and information corresponding to the particular network communication protocol. At 350, depending on the length of the result from the hash operation and the length required for the protocol-specific key for a particular network communication protocol, it may be necessary to truncate, duplicate, combine, or otherwise manipulate the result to generate the protocol-specific key having the correct length required for the protocol-specific key (e.g., as will be further described below with reference to FIG. 4). If the result of the hash operation at 340 is already the correct length, then step 350 may be skipped and the method 300 continues to 360. At 360, the first device communicates with a second device via the particular network communication protocol using the protocol-specific key.

As shown in FIG. 3, steps 340, 350, and 360 may be repeated for each network communication protocol of a plurality of network communication protocols used in the mixed communication network.

Figure 4:
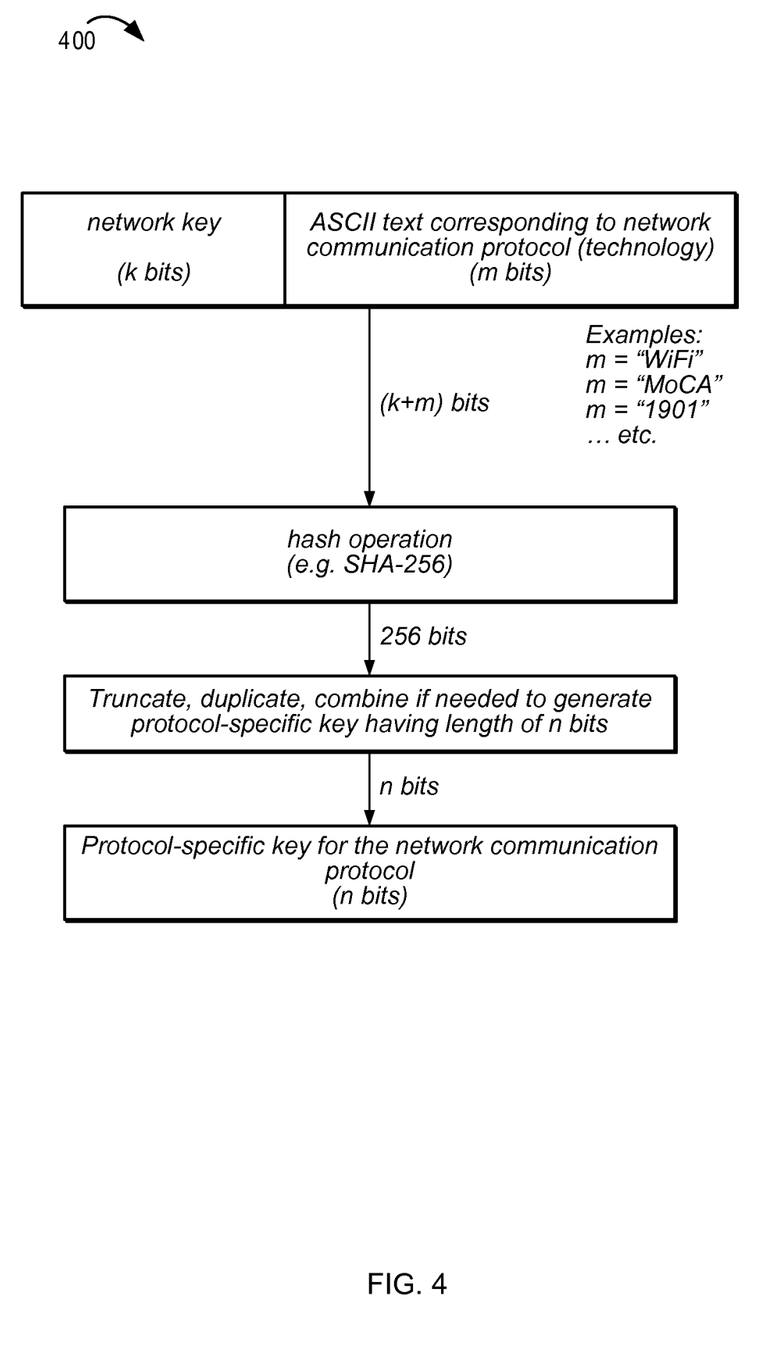
FIG. 4 is another illustration showing an example of a protocol-specific key for use in a mixed communication network in accordance with an embodiment of the present disclosure.

FIG. 4 is another illustration 400 showing an example of a protocol-specific key for use in a mixed communication network. More specifically, as shown in FIG. 4, a network key of k bits and an ASCII text corresponding to a particular network communication protocol of m bits may be used to generate a hash using a hashing function such as SHA-256 or any number of other commonly used hash algorithms. This ASCII text corresponding to the network communication protocol may be all or a portion of the information corresponding to the network communication protocol described above. As non-limiting examples, the ASCII text may be from the set of {"Wi-Fi", "MoCA", "1901" . . . }, for network communication protocols Wi-Fi, MoCA, 1901, etc. Thus, the ASCII text may simply be the name of the network communication protocol or a string indicative of the network communication protocol. Representations other than ASCII are also envisioned, as desired.

The size of the resulting hash may be adjusted. For example, where a size less than 256 bits is required (e.g., according to the requirements of the specific network communication protocol), the hash may be truncated to the appropriate size (in this case n bits). Note that if a password larger than 256 bits is required, multiple hashes may be generated, e.g., using multiple ASCII representations, such as "protocol1", "protocol2", etc. Accordingly, the resulting hashes may be concatenated and possibly truncated to generate an appropriately sized output. The final output may be used (e.g., as an encryption key or password) to perform communication using the network communication protocol. This process may be performed for each network communication protocol, as necessary. Note that the hash may be regenerated each time a communication session is established or the hash may be stored for each network communication protocol, as desired.

It should be understood that FIGS. 1-4 are examples meant to aid in understanding embodiments and should not be used to limit embodiments or limit scope of the claims. Embodiments of each device described herein may comprise additional circuit components, different circuit components, and/or may perform additional operations, fewer operations, and operations in a different order, operations in parallel, and some operations differently. It should be understood that although examples refer to generating certain types of protocol-specific keys for certain network communication protocols, embodiments are not so limited.

Embodiments of each device described herein may take the form of an entirely hardware embodiment, a software embodiment (including firmware, resident software, microcode, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wire line, wireless, optical fiber cable, RF, or other communications medium.

Computer program code for carrying out operations of the embodiments of each device described herein may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through various network topologies, including a local area network (LAN), a personal area network (PAN), or a wide area network (WAN), or the connection may be made to an external computer (for example, through the Internet using an Internet Service Provider).

Figure 5:
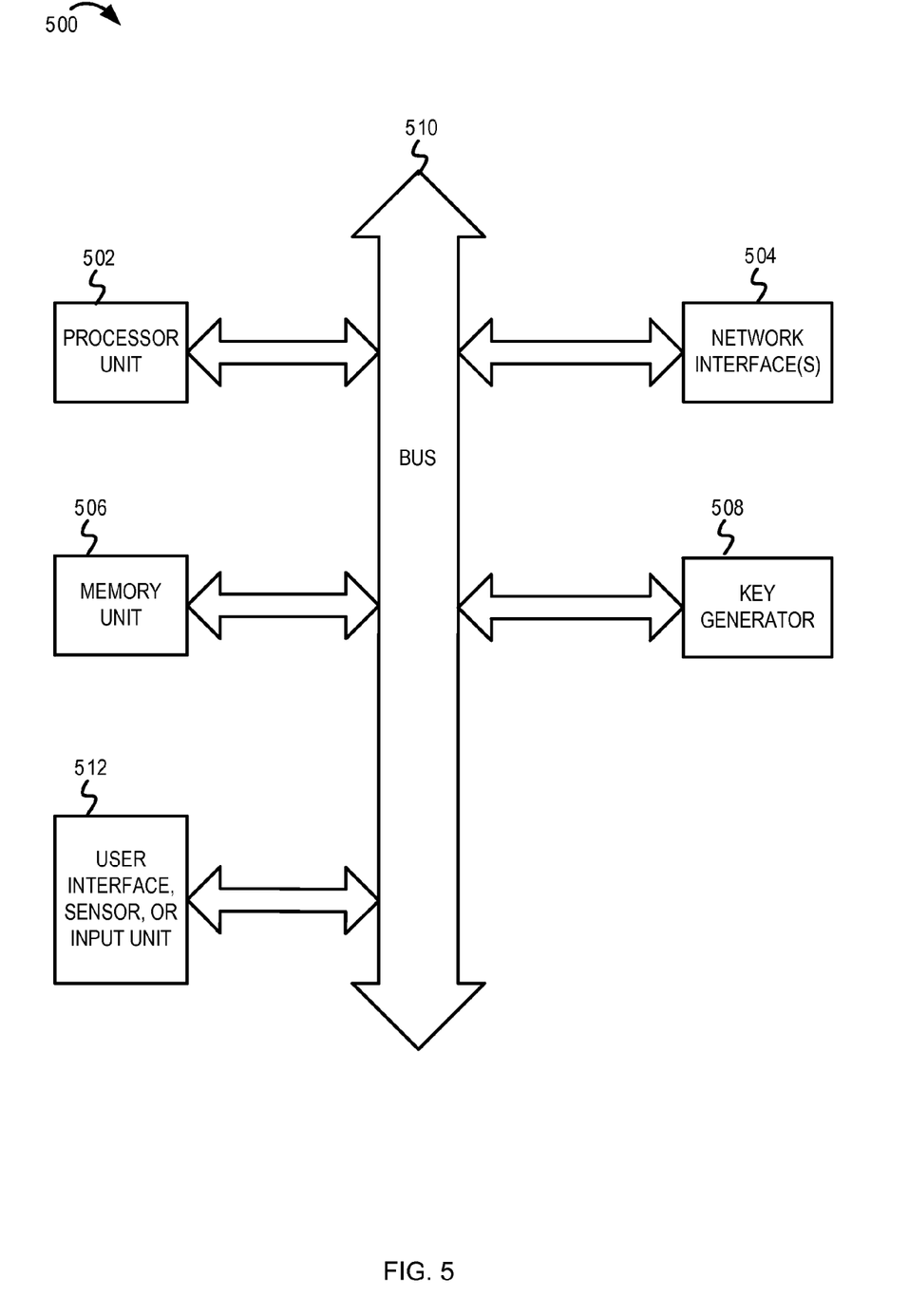
FIG. 5 is a block diagram of one embodiment of an electronic device including a key generator to generate a protocol-specific key for use in a mixed communication network in accordance with an embodiment of the present disclosure.

FIG. 5 is an example block diagram of one embodiment of a device (e.g. devices 110, 120, 130, 140, 150, 240, 250, 260) capable of generating protocol-specific key(s) in accordance with an embodiment of this disclosure. In some implementations, first device is an electronic device 500 and may be one of a laptop computer, a tablet computer, a mobile phone, a powerline communication device, a gaming console, or other electronic systems comprising functionality to communicate across multiple communication networks (which form the mixed communication network). The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 500 can comprise a plurality of network interfaces—each of which couples the electronic device 500 to a different communication network. For example, the electronic device 500 can comprise a powerline communication interface and a WLAN interface that couple the electronic device 500 with a powerline communication network and a wireless local area network respectively.

The electronic device 500 also includes a key generator 508 (similar to key generator 108 of FIG. 1). As described above in FIG. 1, the key generator 508 implements functionality to generate one or more protocol-specific keys based upon a result of hash operation that includes a network key associated with the mixed communication network and information corresponding to a particular network communication protocol. The key generator may then send the protocol-specific key to the network interface 504 or processor 502 to be used for communications via the network communication protocol. It should be understood that in some embodiments, the network interface 504, memory 506, and key generator 508 may comprises part of a communication unit to be used in a device or may be integrated into the device (as shown). For example, in one implementation the network interface 504, memory 506, and key generator 508 are manufactured as a component for use in an appliance, computer, or other electrical device that may be used with a mixed communication network.

Additionally, the electronic device 500 may also have a user interface, user input component, sensor (such as camera, microphone, etc.), or other input unit, which are shown as block 512. It should be noted that these features may or may not be present in various implementations of electronic device 500. If present, these features 512 may be usable by the electronic device 500 to receive the network key associated with the mixed communication network.

Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for generating protocol-specific key(s) as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a network key associated with a mixed communication network, the mixed communication network associated with a first network communication protocol and a second network communication protocol;
   generating, at a first device, a first protocol-specific key for use with the first network communication protocol of the mixed communication network, the first protocol-specific key based at least in part on the network key and a first identifier corresponding to the first network communication protocol; and
   communicating with a second device in the mixed communication network via the first network communication protocol using the first protocol-specific key.

2. The method of claim 1, wherein the first protocol-specific key is used for encryption of communications via the first network communication protocol, and wherein the first protocol-specific key is generated based at least in part on a result of a hash operation that includes the network key and the first identifier.

3. The method of claim 2, wherein said generating the first protocol-specific key includes one of
   truncating the result of the hash operation to generate the first protocol-specific key,
   duplicating the result of the hash operation to generate the first protocol-specific key, wherein the first protocol-specific key is longer than the result of the hash operation, or
   combining the result of the hash operation with a further value to generate the first protocol-specific key.

4. The method of claim 1, wherein said generating the first protocol-specific key includes truncating a result of a hash operation between the network key and the first identifier to include n least significant bits of the result of the hash operation.

5. The method of claim 1, further comprising:
   generating a second protocol-specific key associated with the second network communication protocol of the mixed communication network, the second protocol-specific key based at least in part on the network key and a second identifier corresponding to the second network communication protocol; and
   communicating with a third device via the second network communication protocol using the second protocol-specific key, wherein the first protocol-specific key is different from the second protocol-specific key.

6. The method of claim 5, further comprising:
   storing, at the first device, a plurality of protocol-specific keys corresponding to a plurality of network communication protocols, the plurality of protocol-specific keys including at least the first protocol-specific key and the second protocol-specific key.

7. The method of claim 1, wherein the first network communication protocol is one of Ethernet, multimedia over coax (MoCA), IEEE 1901, powerline communications, or wireless local area network (WLAN), and wherein the second network communication protocol is different from the first network communication protocol.

8. The method of claim 1, wherein the first identifier corresponding to the first network communication protocol comprises an alphanumeric label that uniquely identifies the first network communication protocol.

9. The method of claim 1, further comprising:
   storing, in a memory of the first device, identifiers corresponding to a plurality of network communication protocols that are used in the mixed communication network, the plurality of network communication protocols including at least the first network communication protocol and the second network communication protocol.

10. The method of claim 9, further comprising:
    adding, to the memory of the first device, a new identifier corresponding to a new network communication protocol;
    generating a new protocol-specific key for the new network communication protocol based at least in part on the network key and the new identifier corresponding to the new network communication protocol; and
    communicating with another device via the new network communication protocol using the new protocol-specific key.

11. The method of claim 1, further comprising:
    storing the network key in a memory of the first device.

12. The method of claim 1, wherein the network key is received via one of
    a user interface of the first device,
    a sensor of the first device, or
    a network interface of the first device configured for a different network communication protocol, different from the first network communication protocol.

13. A device, comprising:
    a memory configured to store a network key associated with a mixed communication network, the mixed communication network associated with a first network communication protocol and a second network communication protocol;
    a key generator configured to generate a first protocol-specific key for use with the first network communication protocol, the first protocol-specific key based at least in part upon the network key and a first identifier corresponding to the first network communication protocol; and
    a first communication interface configured to communicate via the first network communication protocol using the first protocol-specific key.

14. The device of claim 13, wherein the key generator is further configured to generate the first protocol-specific key by:
    truncating a result of a first hash operation including the network key and the first identifier,
    duplicating the result of the first hash operation, or
    combining the result of the first hash operation with a further value.

15. The device of claim 13, wherein the key generator is further configured to truncate a result of a first hash operation including the network key and the first identifier, such that the first protocol-specific key comprises n least significant bits of the result of the first hash operation.

16. The device of claim 13,
    wherein the key generator is further configured to generate a second protocol-specific key associated with the second network communication protocol of the mixed communication network, the second protocol-specific key is generated based at least in part on the network key and a second identifier corresponding to the second network communication protocol, the device further comprising:
a second communication interface configured to communicate with a third device via the second network communication protocol using the second protocol-specific key, wherein the first protocol-specific key is different from the second protocol-specific key.

17. The device of claim 16, wherein the memory is further configured to store a plurality of protocol-specific keys corresponding to a plurality of network communication protocols, the plurality of protocol-specific keys including at least the first protocol-specific key and the second protocol-specific key.

18. The device of claim 13, wherein the memory is further configured to store identifiers corresponding to a plurality of network communication protocols, the plurality of network communication protocols including at least the first network communication protocol and the second network communication protocol.

19. The device of claim 13, further comprising:
a user interface component configured to receive the network key associated with the mixed communication network.

20. The device of claim 13, further comprising:
a sensor configured to detect the network key associated with the mixed communication network.

21. The device of claim 13, further comprising:
a second communication interface, different from the first communication interface, the second communication interface configured to receive the network key associated with the mixed communication network.

22. The device of claim 13, wherein the device is an access point of the mixed communication network.

23. A non-transitory computer readable storage medium storing program instructions, wherein the program instructions executed by a processor of a first device cause the first device to:
receive a network key associated with a mixed communication network, the mixed communication network associated with a first network communication protocol and a second network communication protocol;
generate, at the first device, a first protocol-specific key for use with the first network communication protocol of the mixed communication network, the first protocol-specific key based at least in part on the network key and first identifier corresponding to the first network communication protocol; and
communicate with a second device in the mixed communication network via the first network communication protocol using the first protocol-specific key.

24. The non-transitory computer readable storage medium of claim 23, wherein the program instructions executed by the processor of the first device further cause the first device to truncate a result of a first hash operation that includes the network key and the first identifier, such that the first protocol-specific key comprises n least significant bits of the result of the first hash operation.

25. The non-transitory computer readable storage medium of claim 23, wherein the program instructions executed by the processor of the first device further cause the first device to:
generate a second protocol-specific key associated with the second network communication protocol of the mixed communication network, the second protocol-specific key based at least in part on the network key and a second identifier corresponding to the second network communication protocol; and
communicate with a third device via the second network communication protocol using the second protocol-specific key, wherein the first protocol-specific key is different from the second protocol-specific key.

26. The non-transitory computer readable storage medium of claim 25, wherein the program instructions executed by the processor of the first device further cause the first device to store a plurality of protocol-specific keys corresponding to a plurality of network communication protocols, the plurality of protocol-specific keys including at least the first protocol-specific key and the second protocol-specific key.

27. The non-transitory computer readable storage medium of claim 23, wherein the program instructions executed by the processor of the first device further cause the first device to store identifiers corresponding to a plurality of network communication protocols that are used in the mixed communication network, the plurality of network communication protocols including at least the first network communication protocol and the second network communication protocol.

* * * * *